United States Patent
Mader

(10) Patent No.: US 10,202,798 B2
(45) Date of Patent: Feb. 12, 2019

(54) METHOD AND DEVICE FOR FORMING CORNERS IN SPACERS FOR INSULATING GLASS

(71) Applicant: LISEC AUSTRIA GMBH, Seitenstetten (AT)

(72) Inventor: Leopold Mader, Neuhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 318 days.

(21) Appl. No.: 15/226,369

(22) Filed: Aug. 2, 2016

(65) Prior Publication Data

US 2016/0340961 A1    Nov. 24, 2016

Related U.S. Application Data

(63) Continuation of application No. PCT/AT2015/000118, filed on Sep. 10, 2015.

(30) Foreign Application Priority Data

Oct. 20, 2014    (AT) .................................. GM368/2014

(51) Int. Cl.
  *B29C 47/08*    (2006.01)
  *E06B 3/673*    (2006.01)
  *B29C 43/36*    (2006.01)
  *B29C 47/00*    (2006.01)
  *B29C 65/70*    (2006.01)
  *B29K 101/12*    (2006.01)

(52) U.S. Cl.
  CPC ............ *E06B 3/6733* (2013.01); *B29C 43/36* (2013.01); *B29C 47/004* (2013.01); *B29C 65/70* (2013.01); *E06B 3/67313* (2013.01); *E06B 3/67386* (2013.01); *B29K 2101/12* (2013.01)

(58) Field of Classification Search
  None
  See application file for complete search history.

(56) References Cited

U.S. PATENT DOCUMENTS 4,561,929 A * 12/1985 Lenhardt ............... E06B 3/6733
                                                156/106
4,743,336 A *  5/1988 White ................... E06B 3/6733
                                                156/107

(Continued)

FOREIGN PATENT DOCUMENTS

DE    87 01 101 U1    3/1987
DE    36 37 561 A1    5/1987

(Continued)

OTHER PUBLICATIONS

Machine translation of EP-1002925-A2, retrieved Nov. 2018.*

(Continued)

*Primary Examiner* — David P Turocy
(74) *Attorney, Agent, or Firm* — Young & Thompson

(57) ABSTRACT

In order to produce sharp corners in edge regions (2) of a strand (1) of deformable material which is applied to a glass pane, the strand (1) forming a spacer in the insulating glass, a tool (5) is forced against the outer corner (3) and a tool (6) against the inner corner (4). The tools (5, 6) have active portions (7, 8) which correspond to the shape of the outer corner (3) and to the shape of the inner corner (4).

11 Claims, 3 Drawing Sheets

(56) References Cited

U.S. PATENT DOCUMENTS

| | | | |
|---|---|---|---|
| 4,854,022 A | | 8/1989 | Lisec |
| 5,888,341 A | * | 3/1999 | Lafond ................ E06B 3/6733 156/101 |

FOREIGN PATENT DOCUMENTS

| | | | |
|---|---|---|---|
| DE | 43 26 179 A1 | 2/1994 | |
| EP | 0 152 807 A1 | 8/1985 | |
| EP | 0 293 302 A1 | 11/1988 | |
| EP | 0293302 A1 * | 11/1988 | ............. B25B 33/00 |
| EP | 1002925 A2 * | 5/2000 | ......... E06B 3/67386 |
| EP | 1 018 590 A2 | 7/2000 | |
| WO | 94/06992 A1 | 3/1994 | |

OTHER PUBLICATIONS

Austrian Search Report, dated Jun. 2, 2015, from corresponding Austrian Application.
International Search Report, dated Jan. 11, 2016, from corresponding PCT Application.
Chinese Office Action issued in Application No. 201580010101.X, dated Mar. 27, 2017.

* cited by examiner

METHOD AND DEVICE FOR FORMING CORNERS IN SPACERS FOR INSULATING GLASS

FIELD OF THE INVENTION

The invention relates to a method for forming corners in spacers for insulating glass, whereby the spacer consists of a strand made of deformable material that is applied to a glass pane.

The invention further relates to a device with which the method according to the invention can be implemented advantageously.

BACKGROUND OF THE INVENTION

During the production of insulating glass with spacers that are made of deformable, e.g., thermoplastic, material, the procedure is such that, for example, a strand made of deformable material, which is to form the spacer, is applied ("sprayed on") to a glass pane, whereby the strand is located some distance ("recess") from the edge of the glass pane, i.e., is mounted offset inward relative to the edge of the glass pane. After the strand, which forms the spacer, has been applied, the beginning and the end of the strand are connected to one another, for example by the overlapping ends of the strand being compressed.

After the spacer made of deformable material has been closed, a second glass pane is put into place (the insulating glass blank is assembled), and the insulating glass blank is compressed to form a desired distance in order to achieve the intended outside thickness (distance between the outside surfaces of the glass panes and the insulating glass blank from one another).

It is problematic that the corners of such spacers are not sharp-edged, but rather are made with more or less large radii. The corners of strands made of thermoplastic material formed in situ, which form spacers for insulating glass, are often made essentially in the shape of a quarter-circle arc.

For aesthetic reasons, it is also preferred to make the corners in spacers that are made of deformable, e.g., thermoplastic, material, sharp-edged, i.e., with corners that have a very small radius that is as optically imperceptible as possible.

Since the edge joint of an insulating glass blank that is open toward the outside is filled with sealing compound during the production of insulating glass, the problem arises that with corners of larger radii, i.e., rounded corners, the amount of sealing compound required cannot be easily adjusted.

When the corners are not rounded in the spacer but rather are made sharp-edged, less sealing compound is required in the corner area.

Insulating glass elements, which have sharp-edged corners in spacers, are also advantageous for reasons of insulation, in particular heat insulation (smaller heat transfer coefficient).

In the state of the art, various proposals have been made to produce corners in spacers that are made of thermoplastic material.

WO 94/06992 A thus describes the formation of a corner of prefabricated spacers that are made of plastic material, for example butyl rubber or polyisobutylene, whereby the ends of a prefabricated spacer lying in the area of a corner are connected to one another by tools to be placed from the outside and from the inside so that the spacer is closed.

DE 36 37 561 A deals with the application of prefabricated, flexible spacers on glass panels, whereby four systems are provided, with which the corners of a spacer can be formed. Using these systems, the corners of a prefabricated spacer that is in the shape of a quarter-circle arc in the corner area are to be deformed into a sharp corner. To this end, each of the systems has angular components, which are moved toward one another and away from one another using pressure medium motors. One of the angular components is installed from the outside, and the other angular component is placed from the inside on the spacer to be deformed in the corner area to form a sharp corner.

EP 1 018 590 A deals with the in-situ production of a spacer made of thermoplastic plastic, whereby a thermoplastic spacer is applied strand-like from a nozzle onto a glass pane, while the nozzle is moved along the edge of the glass pane. When forming corners, the nozzle is pivoted around an axis that is oriented perpendicular to the glass pane, whereby the nozzle is raised from the glass pane so that the strand made of plastic, which is expelled from the nozzle, does not adhere to the glass pane, while the nozzle is pivoted. The corners of spacers produced according to EP 1 018 590 A2 namely essentially have inner corners that are sharp, but outer corners that are rounded like a quarter-circle arc.

EP 0 152 807 A relates to a device, used in the course of the production of insulating glass, for applying a spacer made of plastic on a vertically-oriented glass pane. To form corners in the spacer, the glass pane, on which the spacer is applied, is to be pivoted, whereby a guide system is provided that is to support the forming of corners in the spacer.

From DE 43 26 179 A, a frameless glazing with a bonded window pane is known. In this case, a bead that forms a spacer is applied on a window pane. In the corner area formed by two ends of the bead that overlap one another, the corner is to be formed by means of a pressure mold tool.

DE 87 01 101 U1 discloses a method for forming at least one corner in spacers for insulating glass, whereby the spacer consists of a strand made of deformable material applied on the glass pane.

In the case of DE 87 01 101 U1, for forming the fourth corner in a prefabricated spacer, an end of the spacer projecting over the corner to be formed is picked up by a tool that acts as a clamp and is bent by the tool by 90°. A die that is provided in the case of DE 87 01 101 U1 has no influence on the shaping and forming of the corner, since it is effective only in the area of the point of contact between the ends of the spacer-forming strand, after the corner has been formed.

SUMMARY OF THE INVENTION

The object of the invention is to envision a method and a device that is suitable for implementing the method, with which sharp-edged corners can be produced in the corner area of spacers of insulating glass produced in situ.

Insofar as the method is concerned, this object is achieved with the features of claim 1.

Insofar as the device according to the invention is concerned, the object underlying the invention is achieved with the independent claim directed toward the device.

Preferred and advantageous configurations of the invention are subjects of the subclaims.

Since tools, for example tools designed in the form of pressing bodies, are used in the method according to the invention and correspondingly in the device according to the invention, which tools are placed on the lateral surfaces—crosswise to the surface of the glass pane—of the spacer applied in situ, sharp-edged corners can be produced in spacers that are made of deformable, e.g., thermoplastic, plastic.

Tools that have effective surfaces, which are formed mirror-inverted to the desired embodiment of the corners, are used in the invention. The effective surfaces of the tool to be placed from the outside are thus a negative of the desired shape of the outer corner in the corner area of the spacers.

The tool that is to be placed on the inner corner can also be formed in such a way that it has effective surfaces, which correspond to the desired shape of the inner corner. Also here, the shape of the effective surfaces of the tool to be placed on the inside of a corner is mirror-inverted (negative) to the desired shape of the inner corner.

Within the framework of the invention, it can be provided that one, two, three or all (four) corners of a spacer of insulating glass is/are brought into the desired shape simultaneously or in succession.

In one embodiment of the invention, it can be provided that a first and/or a second tool is used, which tools have effective surfaces whose angles to one another can be changed.

In one embodiment of the invention, it can be provided that at least two corners in the spacer-forming strand are formed simultaneously.

With the invention, it is provided that the first and second tools for forming the corners are placed simultaneously on the spacer-forming strand.

In one embodiment of the invention, it can be provided that when forming corners in the free surface, facing away from the glass pane, of the spacer-forming strand, at least one recess is produced.

In one embodiment of the invention, it can be provided that the recess is produced simultaneously with the forming of the corners.

BRIEF DESCRIPTION OF THE DRAWINGS

Additional details and features of the invention follow from the description below with reference to the attached schematic drawings. Here.

DETAILED DESCRIPTION OF THE INVENTION

Figure 1:
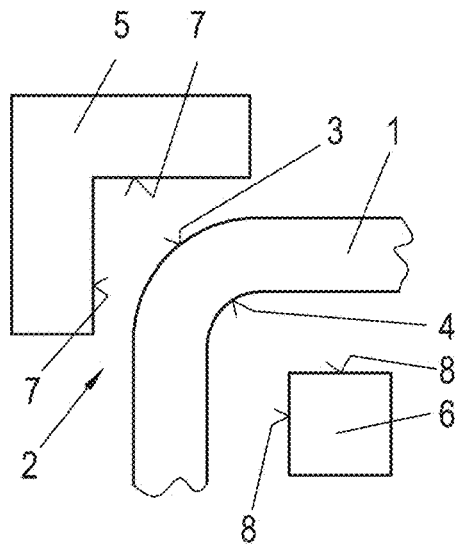
FIG. 1 shows a first embodiment of tools for forming a corner.

When the method according to the invention is executed, a strand 1 made of preferably thermoplastic material is extruded in situ from a nozzle onto a glass pane, in order to apply a frame-like spacer for insulating glass on the glass pane. By adjusting the distance of the nozzle, from which the strand 1 made of thermoplastic material is applied on the glass pane, from the glass pane, care is preferably taken to ensure that the strand 1 in the corner area 2 does not adhere to the glass pane or at least adheres less than in other areas, so that a deformation of the strand 1 in the corner area 2 is possible in the corner area 2 before compression of the corner of the spacer.

The forming of a sharp-edged corner in the spacer, which is formed by the strand 1, is carried out in a corner area 2 by a first tool 5 that engages on the outer corner 3 in the corner area 2 on the outside of the spacer-forming strand 1 and a second tool 6 that engages on the inner corner 4. The tools 5 and 6 are in particular pressing bodies, which are forced onto the strand 1 in the corner area 2 by feed motions of the tools 5 and 6 in order to form the latter from a rounded corner into a corner with sharp edges of the outer corner 3 and the inner corner 4.

The feed motion of the tools 5 and 6 can run parallel to the glass pane or at an (acute) angle to the glass pane.

The tools 5 and 6 can be moved simultaneously in the corner area 2 toward the strand 1.

Since the tools 5 and 6 slide on the glass pane during application on the strand 1, it is preferred to provide the surfaces of the tools 5 and 6 that slide on the glass pane with a coating that reduces the sliding and has a slighter hardness than glass. Instead of a coating, the tools 5 and 6 can be manufactured from a material that has the above-mentioned properties.

The effective surfaces 7 and 8 of the tools 5 and 6, which are placed in the corner area 2 on the outer corner 3 and on the inner corner 4, are preferably provided with coatings that have anti-adhesive properties relative to the material of which the strand 1 consists. As an alternative, the tools 5 and 6 can be manufactured from such a material, in which case coatings are unnecessary.

A heater that is, for example, electric, can be assigned to the tools 5 and 6, or at least one of the same, or at least one of the tools 5 and 6 is preheated, in order to facilitate the compression of the strand 1 in the corner area 2, to form a sharp-edged outer corner 3 and a sharp-edged inner corner 4, by heating the material of the strand 1.

The embodiments of the tools 5 and 6, shown in FIG. 1, are used to generate rectangular corners and therefore have effective surfaces 7 and 8, which are at an angle of 90° to one another, as is shown in FIG. 1.

Figure 2:
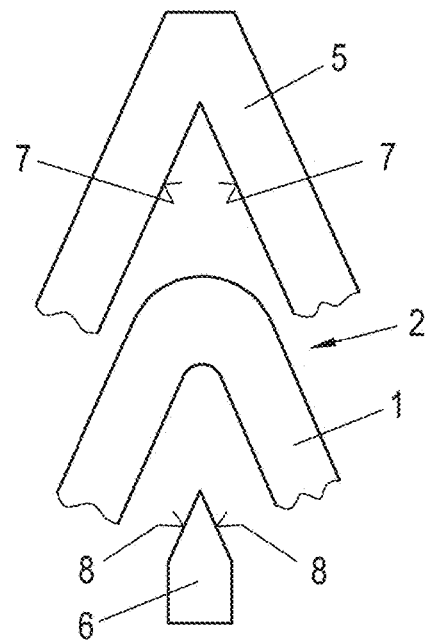
FIG. 2 shows an embodiment of tools for forming an acute-angled corner.

When sharp corners are to be formed in the corner areas 2, in which the strands 1 leading to the corner are at an angle of other than 90°, tools 5 and 6 can be used, as are shown in FIG. 2. In this case, the effective surfaces 7 and 8 of the tools 5 and 6 are at an angle to one another that corresponds to the angle of the corner to be produced.

Figure 3:
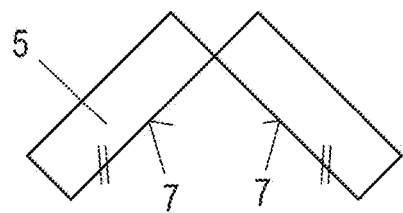
FIG. 3 shows an embodiment of tools, which have effective surfaces, whose angles can be adjusted to one another.
Figure 3:
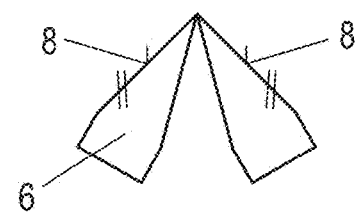

FIG. 3 shows an embodiment of tools 5 and 6, whose effective surfaces 7 and 8 can be adjusted to one another, so that the angles that enclose with one another the effective surfaces 7 of the tool 5 and the effective surfaces 8 of the tool 6 can be adjusted to the angles desired in each case, namely the angles corresponding to the corners.

Figure 4:
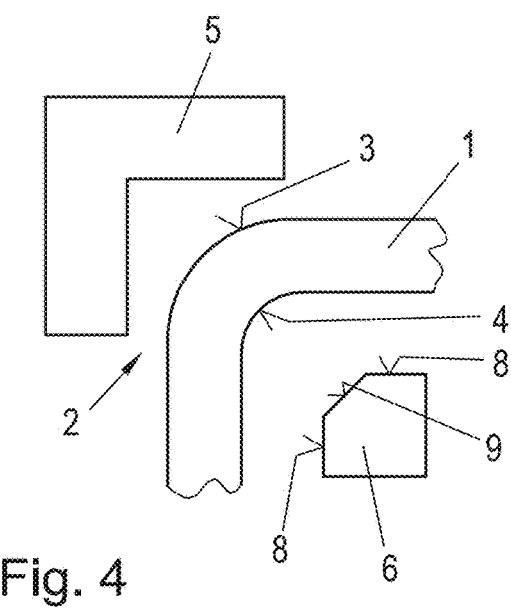
FIG. 4 shows another embodiment of tools.

In one embodiment of the invention, which is shown in FIG. 4, a flat channel is made in the area of the inner corner 4 in the corner area 2 of the strand 1. In this case, the effective surfaces 8 of the second tool 6, which is to be placed on a strand 1 in the area of the inner corner 4, do not adjoin each other in a sharp-edged manner but rather with a transition surface 9.

With reference to FIG. 4, it can be noted that also other sharp-edged shapes can be produced both on the inner corner 4 and on the outer corner 3, by correspondingly formed tools 5 and 6 being used. Thus, it is possible, for example, to produce inner corners 4 by using corresponding tools 5, which inner corners have a hollow channel as an alternative to the flat channel of FIG. 4 or have another concave shape. In the same way, the outer corner 3 can have a bezel or have another convex shape.

Within the framework of the invention, consideration is given to providing four devices, consisting of a first tool 5 and a second tool 6 each, for deforming the four corner areas 2 of a square spacer. In this case, all corners of a spacer can be simultaneously deformed from a strand 1, after the spacer-forming strand 1 has been applied completely to the glass pane.

In the case of insulating glass with less than four or more than four corners, arrangements that consist of a first tool 5 and a second tool 6 corresponding to the number of corners can be provided in order to deform all corners in such spacers simultaneously in the desired way.

Within the framework of the invention, as an alternative, consideration is given to providing two arrangements that in each case comprise a first tool 5 and a second tool 6 in order to simultaneously deform two adjacent corner areas 2 at a time of a spacer, formed from a strand 1, into sharp-edged corners.

This embodiment is advantageous when the movement is carried out within the nozzle from which the strand 1 is applied on a glass pane in such a way that the glass pane is moved in one direction (x-direction), while the nozzle for the application of the strand 1 is actively moved in a direction (y-direction) that is normal to the x-direction. In this case, the deformation of the strand 1 in two corner areas 2, whose positions are identical in the y-direction, can be implemented simultaneously and at a time in which the spacer-forming strand 1 has still not been completely applied.

In a simple embodiment, only one arrangement that consists of a first tool 5 and a second tool 6 is provided, which deforms in succession all corner areas 2 of a spacer that consists of a strand 1, whereby the deformation of the corner areas 2 of the strand 1 is implemented in succession. For example, this embodiment makes it possible to control the movement of the arrangement of the tools 5 and 6 in such a way that it follows the nozzle from which the strand 1 is applied on a glass pane, i.e., it is moved behind the latter relative to the direction in which the nozzle is moved.

In one embodiment of the invention, consideration is given to combining the tools 5 and 6 at least partially with a nozzle from which a strand 1 is applied on a glass pane. In this embodiment, the deformation can be implemented simultaneously with the application of the strand 1 in the corner areas 2 of the strand 1.

Figure 5:
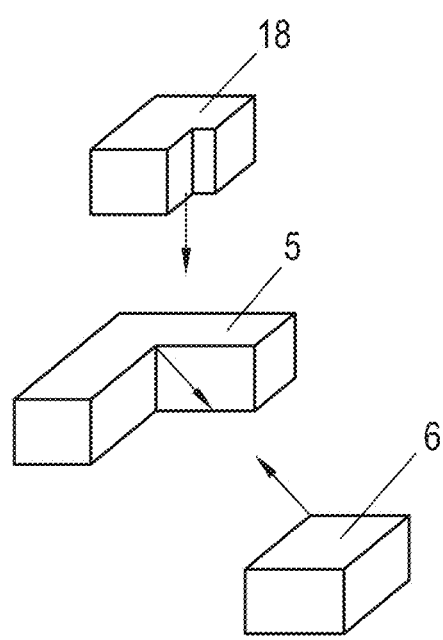
FIG. 5 shows another embodiment of tools for implementing the method according to the invention.

One possible embodiment of this type is shown in FIG. 5.

A nozzle 10, which is shown in elevation in FIG. 5, comprises a longer leg 11 and a shorter (thicker) leg 12. The projection of the longer leg 11 compared to the shorter leg 12 corresponds to the distance of the effective surface 13 of the longer leg 11 from the effective surface 14 of the shorter leg 12.

In addition, an edge 16 is made on the nozzle 10, which edge lies between the effective surface 14 of the short leg 12 and the front surface 15 of the short leg 12.

Within the framework of the invention, consideration is also given to using another hold-down element 18 (FIG. 5), which is placed on the free surface of the strand 1 opposite to the glass pane in order to prevent undesirable deformations of the strand 1 from occurring during the use of the tools 5 and 6 or during the pivoting of the nozzle 10 in such a way that material of the strand 1 is pushed away from the glass pane.

When a hold-down element 18 is placed in the corner area 2, the corner area 2, in which the forming of the corner area 2 into a sharp-edged corner is done, is covered on all sides so that undesirable deformation of the strand 1 is avoided. Namely in this case, the strand 1 is not only covered by the glass pane and the tools 5 and 6, but rather also by the hold-down element 18. A deformation of the strand 1 in the direction of the strand is itself prevented by the reflux of material of the strand 1 that exits from the nozzle 10.

When the points of contact between the ends of a strand 1 that consists of deformable, in particular thermoplastic, material come to lie in a corner area 2, the ends of the strand 1 can be connected tightly to one another by compression.

In this embodiment and in all other embodiments of the method according to the invention, at least one recess can be molded-on (for example by the hold-down element 18) simultaneously to the forming of the corner area 2 in the surface of the strand 1 facing away from the glass pane, on which the strand 1 has been applied, so that during compression of the insulating glass blank to form a desired distance in the interior of the insulating glass blank, no overpressure can develop.

When insulating glass is to be produced from three glass panes, the possibility exists, within the framework of the invention, of deforming spacer-forming strands 1 applied on both sides of the middle glass pane, simultaneously or in succession in corner areas 2 to form sharp-edged corners, by the method according to the invention and the device according to the invention being used.

Even if for reasons of production speed, multiple glass panes are covered with spacer-forming strands 1 simultaneously in synchronously operating situations, the method according to the invention can be used to form sharp-edged corners in the corner area 2.

In the same way, it may be advantageous, for reasons of production speed, to apply the spacer not by a through-going strand 1 made of deformable material but rather to form the spacer from several sections of strands 1. In this case, it can be provided that the corner areas 2 of such spacers are deformed into sharp-edged corners in accordance with the method according to the invention and using the device according to the invention.

Figure 6:
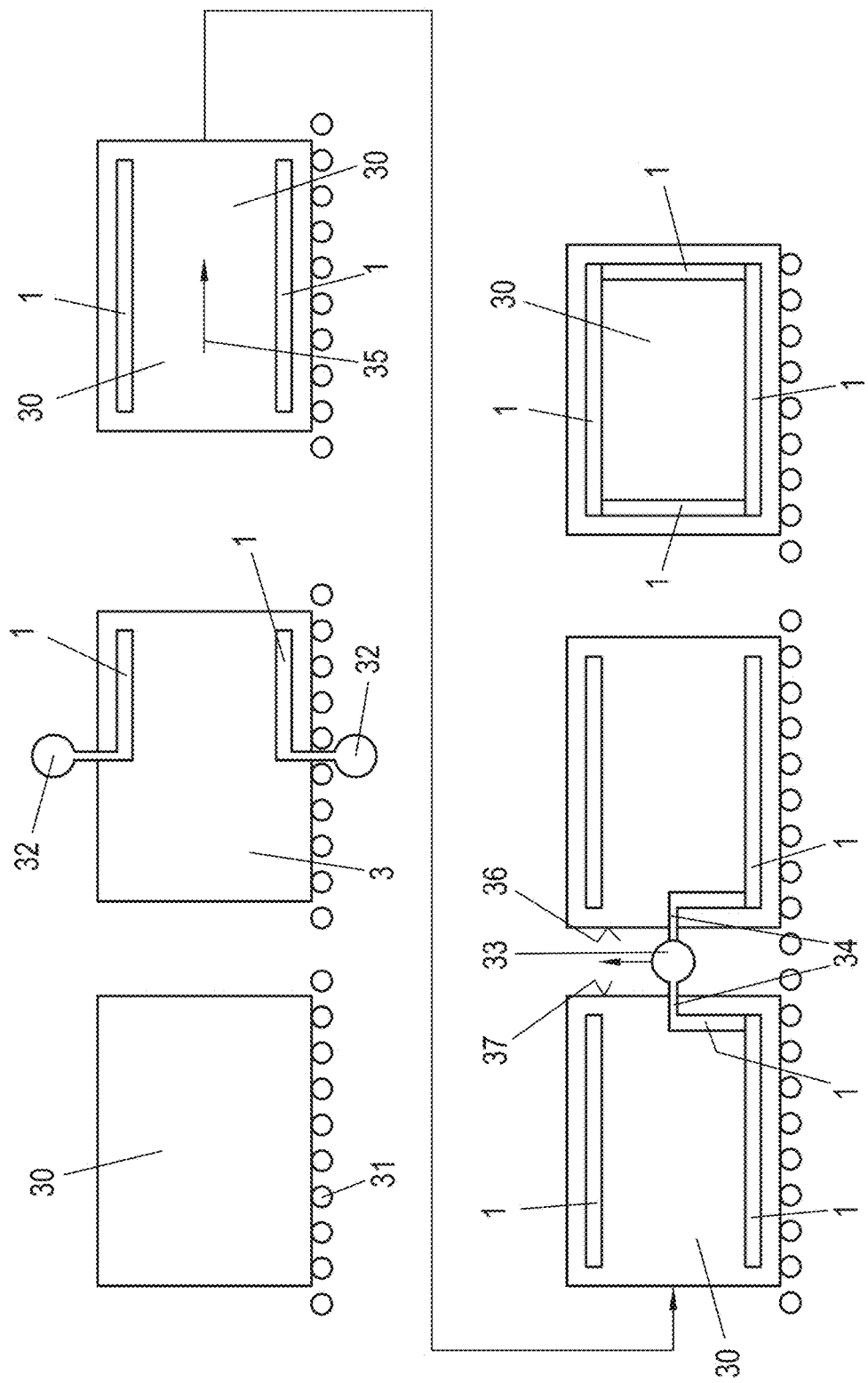
FIG. 6 shows a variant of the method for applying strands made of deformable, e.g., thermoplastic, material.

The method, schematically illustrated in FIG. 6, for applying strands 1 made of deformable, e.g., thermoplastic material, on a glass pane 3 makes it possible to obtain sharp-edged corners during the forming of the corners and also to connect tightly to one another sections of the strand 1, which will form the spacer for insulating glass, by the method according to the invention and/or the tools proposed according to the invention being used.

In the method shown in FIG. 6, glass panes 30 (glass blanks) from an upstream processing machine, e.g., a washing machine, are conveyed in a conveying system 31 into the area of a line for producing insulating glass, in which strands 1 made of deformable, e.g., thermoplastic, material, which are to form spacers, are applied on glass panes 30. In a first step, two horizontal strands 1 are applied by the glass pane 30 being moved relative to two nozzles 32 for applying strands 1 made of thermoplastic material.

In a second and third step, vertical strands 1 are applied, and therefore a nozzle 33 with two outlets 34 (nozzle openings), from which strands 1 are applied on glass panes 30, is used. This makes it possible, as shown in FIG. 10, to apply strands 1 on two successive glass panes 30, whereby one strand 1 is applied in the area of a rear edge 36 of the front glass pane 30 that is vertical in relation to the conveying direction (arrow 35), and a second strand 1 is applied in the area of a front edge 37 of the next glass pane 30, which edge is vertical relative to the conveying direction.

During the application of the strands 1 in the area of vertical edges 36 and 37, the glass panes 30 are stationary at least in the direction in which the nozzle 33 is moved and are then moved forward when strands 1 are applied in the area of all four edges of a glass pane 30, as is shown on the far right in FIG. 10.

In individual sections of the station of FIG. 10 for applying spacer-forming strands 1 onto glass panes 30, buffer or accelerating lines are provided so that a sufficiently high transport speed is ensured overall for the required production speeds.

There is also the possibility, however, of moving the nozzle 30, from which the vertical strands 1 are applied, in the conveying direction (arrow 35), while it applies strands 1.

The individual sections of the strand 1 are compressed on a glass pane 30, and therefore the tools proposed according to the invention can be used with application of the method according to the invention.

In a modified embodiment, the possibility exists of compressing corners in order to form sharp-edged corners, and to connect the sections of the strands tightly together, while the nozzle 33 with two outlets 34 is active or shortly after a point of contact was produced.

The invention claimed is:

1. A method for forming at least one corner in a spacer for insulating glass, the spacer being a strand (1) of deformable material applied to the glass pane, comprising:
   placing a first tool (5) on an outside of the strand (1) in an area (2) of a corner portion thereof;
   placing a second tool (6) on an inside of the strand (1) in the area (2) of the corner portion;
   moving said first and second tools (5, 6) to exert pressure on lateral surfaces of the strand (1) at the corner portion of the strand (1) for forming the corner portion of the strand (1) into a corner shape with outer and inner corners (3, 4), said lateral surfaces being essentially perpendicular to a surface of the glass pane, the outer and inner corners (3, 4) of the strand (1) formed by the first and second tools (5, 6) corresponding to respective shapes of the first and second tools (5, 6);
   simultaneous with the forming of the outer and inner corners of the strand (1) with the moving of the first and second tools (5, 6), exerting a pressure using a hold-down element (18) upon an opposing surface of the strand (1) at the area of the corner portion and facing away from the glass pane, said hold-down element (18) having an effective surface oriented essentially parallel to the opposing surface for contact with the opposing surface,
   wherein the outer and inner corners are formed on the strand (1) by the first and second tools (5, 6) in situ on the surface of the glass pane,
   wherein the first tool (5) has effective surfaces (7) that correspond to a negative shape of the outer corner (3) of the strand (1) to be formed by the first tool (5), the first tool (5) having two effective surfaces (7), at an angle to one another, for shaping the outer corner (3)
   wherein the second tool (6) has effective surfaces (8) that correspond to a negative shape of the inner corner (4) of the strand (1) to be formed by the second tool (6), the second tool (6) having two effective surfaces (8), at an angle to one another, for shaping the inner corner (4),
   wherein the first tool (5) and the second tool (6) are placed on the strand (1) simultaneously, and
   wherein the hold-down element (18) forms a recess in the opposing surface of the strand (1) simultaneously with the forming of the outer and inner corners of the strand (1) with the moving of the first and second tools (5, 6).

2. The method according to claim 1, wherein the first and second tools (5, 6) are pressing bodies for forming the corners.

3. The method according to claim 2, wherein any of the first tool and the second tool (5, 6) is arranged on a nozzle that applies the strand on the glass pane.

4. The method according to claim 1, wherein any of the first tool and the second tool is arranged on a nozzle that applies the strand on the glass pane.

5. The method according to claim 1, wherein the outer and inner corners (3, 4) of the strand (1) are formed by the first and second tools (5, 6) before the strand (1) is adhesively connected to the glass pane.

6. The method according to claim 1, wherein an instance of said first tool (5) and said second tool (6) is placed at each corner of the glass plane, and each corner of the glass plane are brought into a corner shape simultaneously.

7. The method according to claim 1, wherein the angle of the effective surfaces of at least one of said first tool (5) and said second tool (6) is changeable.

8. The method according to claim 1, wherein the first and second tools (5, 6) operate to slide across the surface of the glass pane.

9. The method according to claim 1, wherein the first and second tools (5, 6) comprise a material that is anti-adhesive relative to the material of the strand (1).

10. The method according to claim 1 wherein, prior to the exerting of pressure on the lateral surfaces of the strand (1), the first and second tools (5, 6) are heated.

11. The method according to claim 1 wherein the effective surfaces (8) of the second tool (6) are joined by a transition surface (9) that is intermediary between said effective surfaces (8).

* * * * *